Patented July 5, 1927.

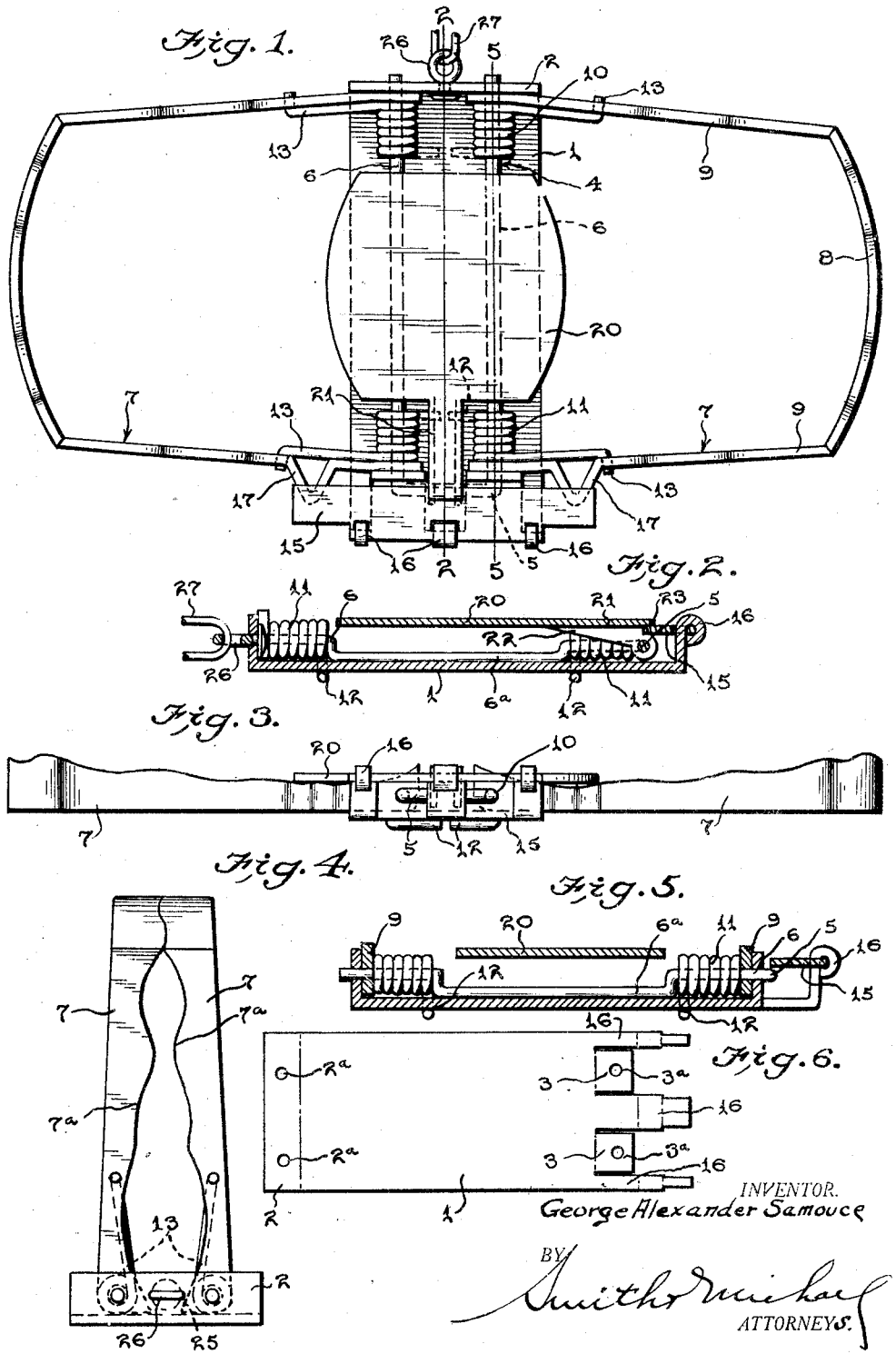

1,634,270

UNITED STATES PATENT OFFICE.

GEORGE ALEXANDER SAMOUCE, OF BROOKLYN, NEW YORK.

ANIMAL TRAP.

Application filed August 10, 1926. Serial No. 128,471.

This invention relates to an improvement in animal traps and one of the principal objects of the invention is to provide an effective trap which embodies in its construction a minimum number of parts and eliminates rivets, bolts and similar fastening devices, while being durable, sturdy and reliable in operation.

An important object of the inventon resides in the provision of novel means for holding the jaws of the trap set in such a manner that when the jaws are released the movement of the holding means incident to such release will not interfere or be liable to interfere with the movement of the jaws or be liable to throw the animal clear of the trap. This novel form of holding means is adapted to and preferably does coact with a tripping plate of wide area located between the jaws of the trap thereby insuring that the animal is in the desired relation to the jaws before the trap is sprung and yet the holding mechanism for the jaws is located entirely outside of the path of movement of the jaws. The desired co-action between the jaws and the holding means is obtained by providing lateral projections on the jaws.

Another object is to provide a highly organized form of trap wherein a single element, preferably in the form of a U-shaped rod serves to mount and operatively relate all of the major elements of the trap except one.

Another object resides in the provision of means for limiting the movement of the jaws when the trap is sprung.

A further object resides in the provision of a novel form of jaw construction whereby the jaws have enhanced gripping and killing power.

A still further object resides in the provision of a simple form of trap which is comparatively inexpensive to manufacture and which is capable of killing the animals entrapped.

Other objects and advantages reside in certain novel features of the construction, arrangement and combination of parts which will be hereinafter more fully described and particularly pointed out in the appended claims, reference being had to the accompanying drawings forming a part of this application and in which:

Figure 1 is a plan view of a trap constructed in accordance with the present invention and showing the jaws of the trap set;

Figure 2 is a view in transverse vertical section on line 2—2 of Figure 1;

Figure 3 is a view in side elevation illustrating the trap as positoned in Figure 1;

Figure 4 is a similar view showing the trap sprung;

Figure 5 is a view in transverse vertical secton on line 5—5 of Figure 1; and

Figure 6 illustrates the blank from which the base is constructed in the embodiment of the invention illustrated.

Referring to the drawings the numeral 1 designates a base plate having an end portion 2 bent upwardly therefrom. Opposite the end portion 2 lugs 3 are struck from the material of the plate and are also extended upwardly. In the lugs 3 and in the end portion, alined openings $2^a$ and $3^a$ are provided and in these alined openings a U-shaped mounting member 4 is fitted and suitably secured. Preferably the U-shaped mounting member consists of a rod of metal of sufficient resiliency to enable it to be bent to its proper form. This U-shaped rod has a body portion 5 extending between the lugs 3 and a pair of legs 6 extending from the lugs 3 to the upstanding end portion 2 and located in spaced parallel relation with respect to each other. The ends of the rod may be peened over against the portion 2 to secure the rod in position after the parts have been assembled therewith. As shown in Figures 2 and 5, the legs 6 of the rod 4 have intermediate portions $6^a$ offset downwardly and engaging the body of the base plate.

A pair of jaws designated at 7 are provided. Each jaw 7 is of substantially U-shaped form and has a curved body portion 8 and a pair of spaced legs 9 extending from the body portion and formed in their ends remote from the body portion with bearing openings 10 in which one of the legs 6 of the U-shaped mounting rod 4 is a working fit. With this arrangement the jaws are mounted for rotary movement on the legs 6 of the mounting rod 4. Springs 10 are associated with the jaws to urge them toward and into engagement with each other. Preferably a pair of springs 10 is provided for each jaw, the members of each pair of springs being mounted in spaced relation to each other on the leg 6 of the mounting member 4 on which the jaw with which they are associated is mounted. Each spring 10 has a coil 11 encircling the leg 6 with which it is associated, a terminal 12 extended through an aperture in the base plate 1 and bent to be held engaged in such aperture and a terminal 13 having a laterally offset end engaged with the adjacent leg of the associated jaw.

For the purpose of holding the jaws 7 set, that is, spread apart and in the substantially horizontal position shown in Figures 1 and 3, holding means is provided and includes an elongated holding plate 15 pivotally mounted on upstanding pivot lugs 16 integrally formed with the base plate 1 at one end thereof. The holding plate 15 is engageable with lateral projections 17 formed on the jaws 7, the projections 17 preferably being constituted by outwardly displaced V-shaped portions of the adjacent legs 9 of the jaws. As clearly shown in the drawings, the pivotal mounting of the holding plate on the base plate is laterally spaced from the jaws and the holding plate, although engageable with the projections 17, lies wholly and entirely out of the path of movement of the jaws 7. Moreover, the edge of the plate that is pivoted on the base is remote from the jaws so that in swinging out of engagement with the projections 17 the holding plate 15 swings away from the jaws.

Tripping mechanism is provided for the holding means and comprises a trip plate 20 of relatively broad area, the trip plate 20 overlying the base plate between the legs of the jaws. As will be understood from Figures 1 and 2, the trip plate 20 has a lateral extension 21 to the underside of which a pivot bearing 22 is secured, the pivot bearing 22 having an opening in which the body portion 5 of the mounting rod 4 is rotatably fitted. One end of the lateral extension 21 projects beyond the attaching portion of the pivot bearing 22 and constitutes a lip engageable with the holding plate to maintain the same engaged with the jaws when the jaws are spread apart and the trap is set.

When an animal steps upon the trip plate 20 the trip plate is swung downwardly, the downwardly offset portion 6ª of the leg 6 of the mounting rod affording the clearance necessary to permit operative movement of the trip plate, and the downward movement of the trip plate disengages its lip 23 from the holding plate 15, thereby permitting the springs 10 to bring the jaws together with a sharp, quick and forcible movement. The animal may thus be not only entrapped but also killed as the jaws strike the animal a forcible crushing blow. An important feature of the invention resides in the organization of the holding means with the jaws. In this respect it is to be noted that when the holding plate 15 is disengaged from the lip 23 and swings outwardly it will not throw the animal clear of the trap since it is located entirely outside of the jaws and is spaced from the trip plate whereon the animal has stepped. Again by locating this holding plate entirely outside of the path of movement of the jaws it cannot and does not interfere and is not even liable to interfere with the movement of the jaws, renders the trap safe for persons setting the same.

As will now be apparent from the foregoing description the trap is constructed from a comparatively few number of parts and bolts, rivets and similar fastening devices are eliminated. One of the features that contributes largely to these advantages is the U-shaped mounting rod which affords a pivot bearing for the jaws, a mounting for the springs and a support for the trip plate. Thus all of the important elements of the trap except the holding plate are mounted on this single mounting member 4.

The end of the leg 9 of each jaw pivotally mounted on the U-shaped rod 4 has a substantially triangular enlargement 25 engageable with the base plate to prevent the jaws from moving through an arc of over ninety degrees. In other words, the enlargements 25 constitute stops which limit the movements of the jaws to a vertical position or rather to the substantially vertical position shown in Figure 4. This is an important feature as coil spring actuated jaws do not close at the same speed, that is to say, one jaw may close faster than the other.

It is to be noted that the jaw members 7 are relatively long and narrow so that when sprung they will tend to grip the animal about the body rather than the foot or leg, as is the usual practice and to this end the confronting edges of the jaws have the wave-like or sinuous formation designated at 7ª in Figure 4 to better enhance the grippig and killing action of the jaws with respect to the animals, it being noted particularly that said wave like or sinuous formation extends throughout the spaced leg portions of the jaws, which portions directly engage the animal's body.

The upstanding portion 2 of the base plate is provided with a swivelled eye 26 whereby the trap may be connected by means of the usual chain 27 to the usual stake (not shown).

In conclusion it is to be understood that while I have here chosen to show and describe a preferred embodiment of my invention, such illustration and description is for the purpose of example only and not to be construed as defining the limits of the invention which are to be ascertained from the scope of the appended claims.

What is claimed is:

1. A trap comprising a base plate, cooperable jaws mounted on said base plate, said jaws having lateral projections, a holding plate pivotally mounted on the base plate to one side of the jaws, said holding plate having a portion engageable with the lateral projections to hold the jaws set, and a trip plate pivotally mounted on the base plate and located between the jaws, said trip plate having a lip engageable with the holding plate when the jaws are set.

2. A trap comprising cooperable jaws, said jaws having projections extending outside of the path of movement of the jaws, means located outside of the path of movement of the jaws and engageable with the projections to hold the jaws set, and tripping mechanism for said means.

3. A trap comprising a base plate, a pair of cooperable jaws pivotally mounted on the base plate and having spaced lateral projections at one side thereof, an elongated holding plate having a pivotal mounting on the base plate laterally spaced from the jaws but swingable toward the jaws to engage the lateral projections and hold the jaws set, the holding plate being swingable away from the jaws when releasing the same and operating entirely outside of the path of movement of the jaws and a trip plate pivotally mounted on the base plate between the jaws and having a lip engageable with the holding plate.

4. A trap comprising a base plate, a pair of U-shaped jaws having engageable body portions and also having legs pivotally mounted on the base plate, the ends of the legs adjacent the base plate having substantially triangular enlargements engageable with base plate to limit the movement to such position as will permit engagement of the body portion of the jaws, spring means for urging the jaws toward each other, means for holding the jaws set, and tripping mechanism for said last mentioned means.

5. A trap comprising a base plate having upstanding portions provided with alined openings, a U-shaped mounting rod having legs fitted in said alined openings and also having a body portion connecting the legs, cooperable jaws having bearing portions rotatably fitted on the legs, springs having coils encircling the legs of the rod and also having terminals engaged with the base plate and with the jaws, means cooperable with the jaws for holding the same set, and a trip plate for said means pivoted on the body portion of the rod.

6. A trap comprising a base, cooperable jaws, springs for urging the jaws toward each other, holding means for maintaining the jaws set, a trip plate cooperable with said holding means, and a single mounting member for the jaws, springs, and trip plate, said mounting member being supported on the base.

7. An animal trap comprising a base provided with spaced jaw pivots, cooperative U-shaped jaw members invertedly mounted in said spaced pivots, and operating mechanism to forcibly move the jaws together to bring the yoke portions thereof into contact, the leg portions thereof remaining in spaced relation, said leg portions being serrated on their front edges whereby to enhance the gripping action thereof.

8. A trap comprising a base plate, a pair of jaws pivotally mounted on the base plate and having stop shoulders engageable with the base plate to limit the swinging movement of the jaws to such position as will permit the jaws to come into cooperative relation, spring means for urging the jaws into cooperative relation, means for holding the jaws set, and tripping mechanism for said last mentioned means.

9. A trap comprising a base plate having upstanding portions, said portions being provided with alined openings, a U-shaped mounting rod having legs fitted in said alined openings and also having a body portion connecting the legs, a pair of cooperable jaws of substantially U-shaped form and having legs provided with bearing openings receiving the legs of the mounting rod and also having cooperable body portions, springs having coils embracing the legs of the mounting rod and also having terminals engaged with the legs of the jaws and with the base plate, pivot lugs upstanding from the base plate at one side of the jaws, an elongated holding plate having one edge portion pivotally mounted on said lugs, the adjacent legs of the jaws having lateral projections of V-shaped form with which the holding plate is engageable, and a trip plate pivoted to the body portion of the mounting rod, positioned between the jaws, and having a lip engageable with the holding plate.

10. An animal trap comprising a base provided with spaced jaw pivots, U-shaped jaw members invertedly mounted in said spaced pivots, said jaw members being relatively long and narrow whereby the leg portions of the jaw members will grip the body of an animal springing the trap, said leg portions of the jaws being serrated on their front edges to enhance their body gripping power.

In testimony whereof I hereunto affix my signature.

GEORGE ALEXANDER SAMOUCE.